United States Patent [19]

Whelan

[11] Patent Number: 4,655,469

[45] Date of Patent: Apr. 7, 1987

[54] BALL CYCLE

[76] Inventor: Michael J. Whelan, 55-23 31st. Ave., Apt. 3AJ, Woodside, N.Y. 11377

[21] Appl. No.: 812,806

[22] Filed: Dec. 23, 1985

[51] Int. Cl.⁴ .......................... A62H 1/12; B62K 1/00
[52] U.S. Cl. .................................... 280/208; 301/37 P
[58] Field of Search ............... 280/205, 208, 289 WC; 301/37 R, 37 P, 37 S

[56] References Cited

U.S. PATENT DOCUMENTS

| 985,370 | 2/1911 | Robbins | 280/205 |
| 2,950,127 | 8/1960 | Phillips | 280/205 X |
| 3,004,798 | 10/1961 | Tylle | 301/37 P |
| 3,829,127 | 8/1974 | McLellan | 280/205 X |
| 3,924,898 | 12/1975 | Kain | 301/37 P |
| 4,176,851 | 12/1979 | Simonson et al. | 280/205 X |
| 4,264,085 | 4/1981 | Volin | 280/289 R |
| 4,324,413 | 4/1982 | Bensette et al. | 280/205 |

Primary Examiner—John A. Pekar
Attorney, Agent, or Firm—Michael I. Kroll

[57] ABSTRACT

A ball cycle is provided and consists of a seat carried by a frame for supporting a body of a rider thereon, a mechanism for driving a pair of large wheels spaced apart and carried on a main axle which is rotatably mounted on the frame, a pair of stabilizing small rear wheels and a steering small front wheel so that hands of the rider are free allowing for a team sport to be played and a pair of bumpers placed on ends of the main axle to act as a safety device for reducing risk of injury to the rider.

7 Claims, 3 Drawing Figures

BALL CYCLE

BACKGROUND OF THE INVENTION

1. Field of the Invention

The instant invention relates generally to cycles and more specifically it relates to a ball cycle.

2. Description of the Prior Art

Numerous cycles have been provided in prior art that are equipt with various mechanisms for improving the operation of the cycles. For example, U.S. Pat. Nos. 335,253 and 2,802,300 are illustrative of such prior art. While these units may be suitable for the particular purpose to which they address, they would not be as suitable for the purposes of the present invention as heretofore described.

SUMMARY OF THE INVENTION

A principle object of the present invention is to provide a ball cycle that will overcome the shortcomings of the prior art devices.

Another object is to provide a ball cycle that is controlled and steered by the body of the rider so that the hands would be free allowing a team sport to be played.

An additional object is to provide a ball cycle that is cushioned by concave rubber bumpers placed on each end of main axle as a safety device to reduce the risk of injury to the rider.

A further object is to provide a ball cycle that is simple and easy to use.

A still further object is to provide a ball cycle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention.
FIG. 2 is a rear view thereof.
FIG. 3 is a partial front view thereof.

DETAILED DESCRIPTION OF THE PREFERRED EMBODIMENTS

Figure 1:
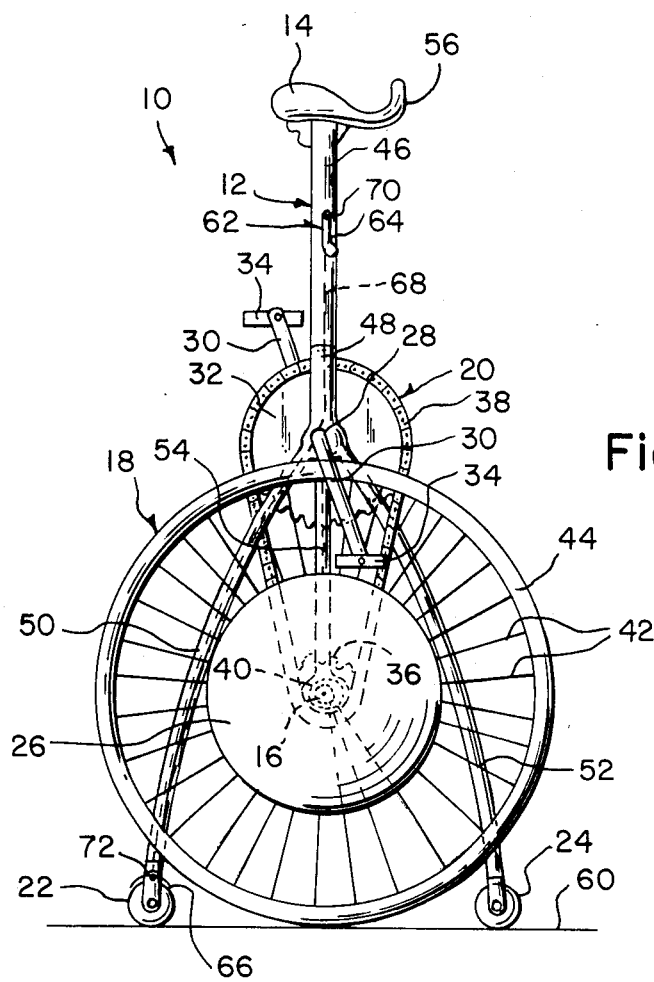
Figure 3:
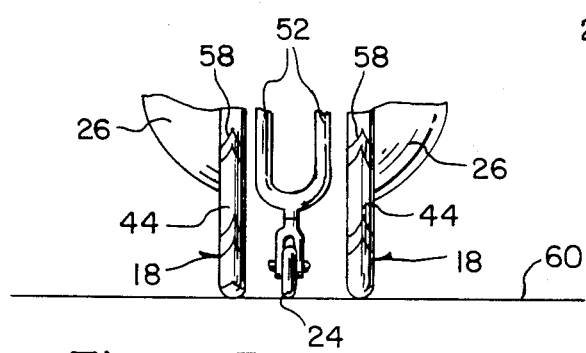
Figure 2:
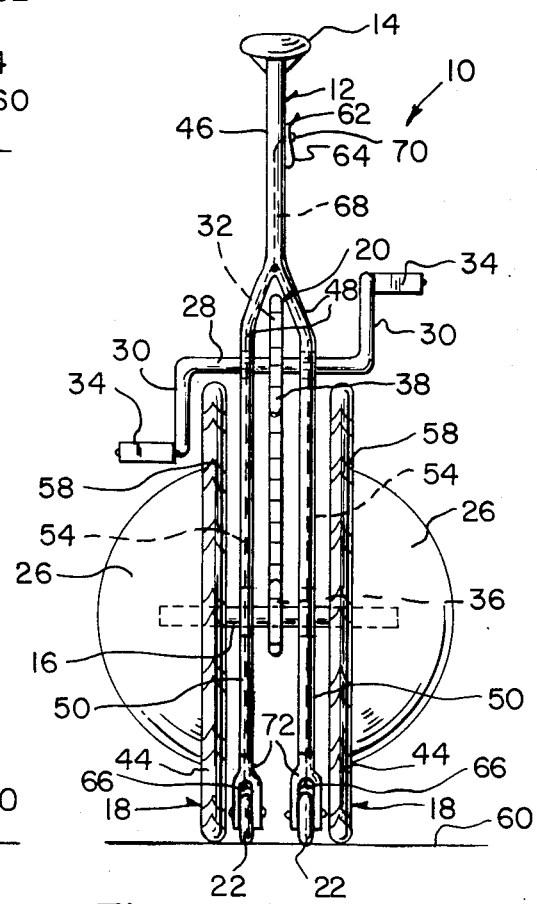

Turning now descriptively to the drawings, in which similar reference characters denote similar elements throughout the several views, FIGS. 1 through 3 illustrates a ball cycle 10 that includes a frame 12 being in a generally vertical elongated position and a seat 14 carried by the frame 12 for supporting a body of a rider thereon (not shown).

A main axle 16 is rotatably mounted on the frame 12. A pair of large wheels 18 are spaced apart and carried by the main axle 16. A mechanism 20 is provided for driving the large wheels 18 and carried by the frame 12.

A pair of small rear wheels 22 are spaced apart, swiveled and rotatably mounted on the frame 12 for stabilizing the cycle. A small front wheel 24 is swiveled and rotatably mounted on the frame 12 in which the cycle 10 can be controlled and steered by the body of the rider. Hands of the rider are free allowing for a team sport to be played, such as basketball or hockey.

A pair of bumpers 26 shown in the drawings are also provided. Each of the bumpers 26 are placed over each end of the main axle 16 against one of the large wheels 18 to act as a safety device for reducing risk of injury to the rider. Each of the bumpers 26 is a concave rubber member being in the shape of a portion of a ball for cushioning sides of the large wheels 18.

The driving mechanism 20 is a crankset which includes a crank axle 28 that has a pair of crank arms 30 extending therefrom. The crank axle 28 is rotatably mounted on the frame 12. A sprocket 32 is carried on the crank axle 28. A pair of pedals 34 are also provided. Each pedal 34 is mounted on one of the crank arms 30. A gear 36 is carried on the main axle 16. A continuous chain 38 goes around and between the sprocket 32 and the gear 36 so that feet of the rider can operate the pedals 34, turning the sprocket 32, the chain 38, the gear 36, the main axle 16 and the large wheels 18.

Each wheel 18 includes a hub 40 carried on the main axle 16. A plurality of spokes 42 readily extend from the hub 40. A tire 44 is affixed to the spokes 42.

The frame 12 includes a vertical tube 46 for carrying the seat 14. A forked tube 48 is for rotatably mounting the crank axle 28. A pair of rear fork blades 50 extend downwardly and rearwardly from the forked tube 48 for rotatably mounting the small rear wheels 22. A pair of front fork blades 52 extend downwardly and forwardly from the forked tube 48 for rotatably mounting and swiveling the small front wheel 24. A pair of stays 54 extend downwardly from the forked tube 48 for rotatably mounting the main axle 16.

The seat 14 includes a handle 56 to help the rider mount the cycle 10. Each of the large wheels 18 contains a plurality of cleats 58 around the tire 44 to increase traction of the wheel on a flat surface 60.

The ball cycle 10 further contains a braking system 62 which includes a brake lever 64, a pair of brakes 66 and a cable 68. The brake lever 64 is pivotly mounted at 70 on the vertical tube 46 of the frame 12 to be operated by knee of the rider. Each brake 66 is placed on each distal end 72 of each of the rear fork blades 50 near each of the rear small wheels 22. The cable 68 extends between the brake lever 64 and the brakes 66 so that operation of the brake lever 64 will allow the cable 68 to activate and deactivate the brakes 66.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A ball cycle comprising:
   (a) a frame being in a generally vertical elongated position;
   (b) a seat carried by said frame for supporting a body of a rider thereon;
   (c) a main axle rotatably mounted on said frame;
   (d) a pair of large wheels spaced apart and carried on said main axle;
   (e) means for driving said large wheels and carried by said frame;
   (f) a pair of small rear wheels spaced apart swiveled and rotatably mounted on said frame for stabilizing said cycle;

(g) a small front wheel swiveled and rotatably mounted on said frame in which said cycle can be controlled and steered by said body of said rider so that hands of said rider are free allowing for a team sport to be played; and (h) a pair of bumpers, each one of said pair of bumpers placed over each end of said main axle against one of said large wheels to act as a safety device for reducing risk of injury to said rider, each one of said pair of bumpers including a concave rubber member being in the shape of a portion of a ball for cushioning sides of said large wheels.

2. A ball cycle as recited in claim 1, wherein said driving means is a crank set which includes:

(a) a crank axle having a pair of crank arms extending therefrom, said crank axle is rotatably mounted on said frame;

(b) a sprocket carried on said crank axle;

(c) a pair of pedals, each of which are mounted on one of said crank arms;

(d) a gear carried on said main axle; and (e) a continuous chain around and between said sprocket and said gear so that feet of said rider can operate said pedals turning said sprocket, said chain, said gear, said main axle and said large wheels.

3. A ball cycle as recited in claim 2, wherein each of said wheel includes:

(a) a hub carried on said main axle;

(b) a plurality of spokes radially extending from said hub; and (c) a tire affixed to said spokes.

4. A ball cycle as recited in claim 3, wherein said frame includes:

(a) a vertical tube for carrying said seat;

(b) a forked tube for rotatably mounting said crank axle;

(c) a pair of rear fork blades extending downwardly and rearwardly from said forked tube for rotatably mounting said small rear wheels;

(d) a pair of front fork blades extending downwardly and forwardly from said forked tube for rotatably mounting and swiveling said small front wheel; and (e) a pair of stays extending downwardly from said forked tube for rotatably mounting said main axle.

5. A ball cycle as recited in claim 4, wherein said seat includes a handle to help said rider mount said cycle.

6. A ball cycle as recited in claim 5, wherein each of said large wheels includes a plurality of cleats around said tire to increase traction of said wheel.

7. A ball cycle as recited in claim 6, further comprising a braking system which includes:

(a) brake lever pivotly mounted on said vertical tube of said frame to be operated by knee of said rider;

(b) a pair of brakes, each of said brakes placed on each distal end of each of said rear fork blades near each of said rear small wheels; and (c) a cable extending between said brake lever and said brakes so that operation of said brake lever will allow said cable to activate and deactivate said brakes.

* * * * *